(No Model.)
F. J. GRODAVENT.
BICYCLE CRANK AXLE.
No. 566,906. Patented Sept. 1, 1896.
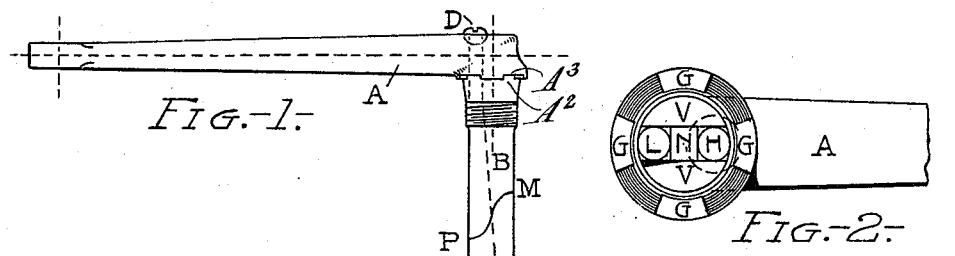
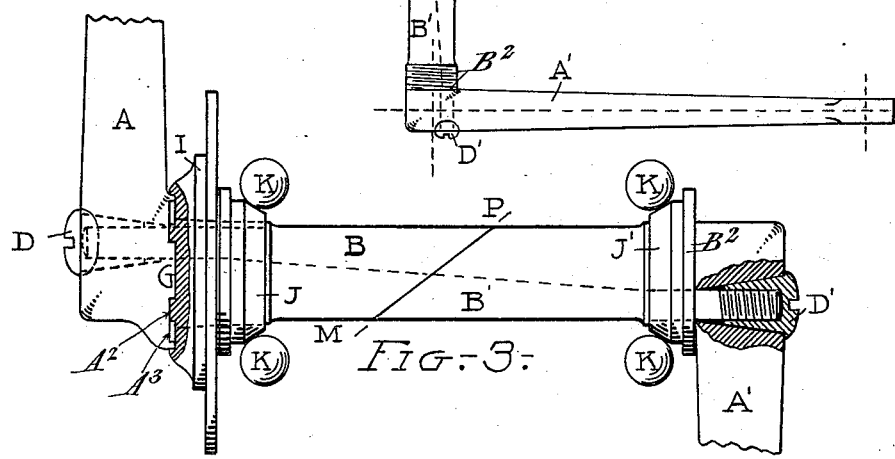
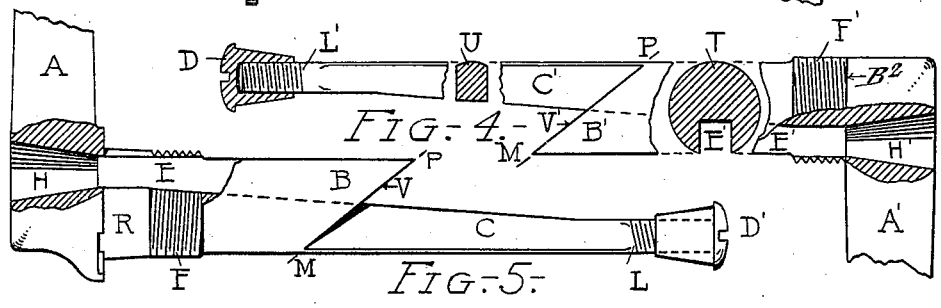
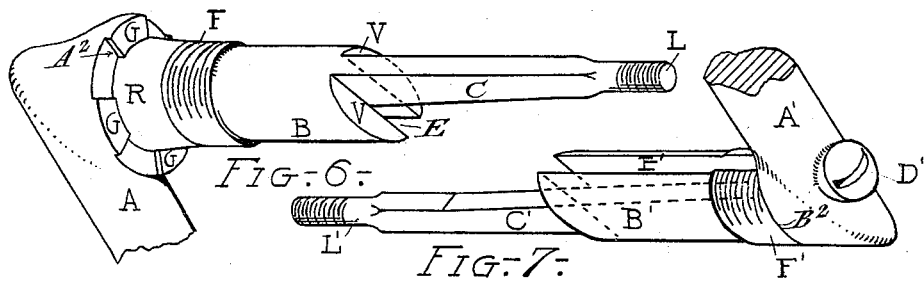
Witnesses.
Herbert D. Grodavent
James A. Swarthout
Inventor.
Frank J. Grodavent

UNITED STATES PATENT OFFICE.

FRANK J. GRODAVENT, OF DENVER, COLORADO, ASSIGNOR OF ONE-THIRD TO ALBERT W. HORN, OF SAME PLACE.

BICYCLE CRANK-AXLE.

SPECIFICATION forming part of Letters Patent No. 566,906, dated September 1, 1896.

Application filed August 24, 1895. Serial No. 560,452. (No model.)

*To all whom it may concern:*

Be it known that I, FRANK J. GRODAVENT, a citizen of the United States of America, residing at Denver, in the county of Arapahoe and State of Colorado, have invented certain new and useful Improvements in Bicycle Crank-Axles; and I do declare the following to be a full, clear, and exact description of the invention, such as will enable others skilled in the art to which it appertains to make and use the same, reference being had to the accompanying drawings, and to the letters of reference marked thereon, which form a part of this specification.

My invention relates to improvements in bicycle crank-axles; and the objects of my invention are, first, to provide an integral crank and axle for opposite sides of the bicycle crank-hanger, which are adapted to be detachably united in a continuous rigid axle; second, to provide a crank for each side of the crank-hanger having integral half-axle portions, the said half-axles of each crank being formed independent of the other and adapted to coöperate with one another to form a continuous rigid detachable crank-axle; third, to provide means for securing the half-axles of the cranks together into a continuous rigid detachable crank-axle in such a manner that the two independent axles will draw toward and rigidly lock to one another and together; fourth, to provide means whereby the sprocket driving-wheel and the roller-bearings are adjustable and removably secured to said independent integral crank-axle portions and their cranks, independent of the means employed to secure the separate halves of said crank-axle into a continuous axle. I attain these objects by the mechanism illustrated and described in the accompanying drawings and specification, in which—

Figure 1 represents a plan view of my improved separable crank-axle and integral cranks. Fig. 2 represents an end elevation of one crank and its half-axle, only a fragment of the crank being shown. Fig. 3 represents in elevation the half-axles of each crank united into a continuous complete rigid axle, also fragments of the cranks and sectional views of minor parts. Fig. 4 represents a fragmentary view of one of the cranks and its integral half-axle. Fig. 5 represents in elevation a fragment of one of the cranks and its integral half-axle, showing in section a taper-aperture in the base of the crank registering with a slot E, formed in its half-axle portion. Figs. 6 and 7 represent perspective views of the opposite cranks with their integral half-axles.

Similar letters of reference refer to similar parts throughout the several views.

Referring to Fig. 1, a general plan view is shown, in which A represents one crank; B, its half-axle; A', the opposite crank, and B' its half-axle. The two half-axle portions B and B' are formed to overlap one another conjunctively in an oblique plane cutting their longitudinal axis. These half-axles are united in this view and also in Fig. 3 to form a continuous complete rigid axle with integral oppositely-arranged cranks. Each half of the axle comprises a cylindrical integral extension of the crank, which extends from it at approximately right angles. This cylindrical extension is reduced in diameter at a point adjacent to the inner side of the cranks in order to form a shoulder $A^2$ on half-axle B and a shoulder $B^2$ on half-axle B'. In the face of shoulder B, I form a clutch-surface which consists of receding portions $A^3$ and projecting portions G, arranged alternately in equal divisions. (See Fig. 2.) Adjacent to the clutch-shoulder of half-axle B, I form a taper-surface R, which is adapted to receive the sprocket driving-wheel I. This wheel is provided with a hub, the face of which is provided with a clutch-surface adapted to register with that of the shoulder $A^2$. Adjacent to the taper portion of the half-axle B, I cut a thread F, which is adapted to receive the interiorly-threaded roller-bearing J. This roller-bearing J is turned up against the sprocket-wheel and holds its clutch-hub in mesh with the clutch of the shoulder, as shown in Fig. 3. Also on half-axle B', adjacent to the shoulder $B^2$, I cut a thread F' to receive the opposite roller-bearing J', which on this half-axle screws up against the shoulder B², as shown in Fig. 3. The cylindrical half-axles of each crank extend to and meet in abutment or end to end at approximately a central point between them, with the exception of a portion C and C' of each half-axle, which is extended beyond the abutting ends and forms a key on each axle. These keys C and C' are preferably rectangular in cross-section, except at the ends L and L', where they blend into cylindrical form and have threads cut on them to which are fitted taper-nuts D and D'. Each of the keys C and C' extends in depth from the center of the cylindrical portion of each axle to its surface, and in width they are about one-third of the diameter of the axles, and each tapers from the center of each cylindrical half-axle to its end. A rectangular slot or keyway E and E' is made in the respective half-axles in each cylindrical portion which extends along each axle from the taper side of the keys and parallel with their taper-surfaces, thus continuing the angle of the taper of each key through the keyways to the inside of the cranks. At this point a hole H is drilled through the cranks, which is tapered larger at its outlet on the outside of each crank and is adapted to receive the taper-nuts D and D'. The taper-keys of each half-axle are adapted to fit freely but snugly in the keyways of each opposite half-axle, and their taper edges are adapted to contact and bear on each other, and they are made long enough to extend through the taper-holes H in the opposite crank, where they are secured by the said taper-nuts. The abutting ends V and V' of each half-axle I cut at oblique opposing angles M P, in order that they will register with each other and form an oblique joint, which will operate to draw the halves together transversely when they are drawn together longitudinally by the taper-nuts. To unite the half-axles to form a complete and continuous rigid axle, it is only necessary, referring to Figs. 6 and 7, to place the key C of half-axle B in the keyway E' of half-axle B' and the key C' of half-axle B' in keyway E of half-axle B, and then press them together transversely and longitudinally. The threaded ends of the keys C and C' will project into and through taper-holes H and H' in the cranks, and the cylindrical ends of the half-axles will meet in abutment. By turning the nuts on the ends of the keys and tightening them they will draw the halves together. The oblique joint at the center will draw the halves tightly together transversely, and the nuts the halves longitudinally. The nuts and the holes in the cranks are made tapering to prevent their lateral movement and the possibility of the keys working loose in the keyways.

In Fig. 2, L designates the end of the key C; V and V, the end of the axle; N, the taper edge of the key C, and H the end view of the perforation through the crank A, which is a continuation of the keyway E, which is represented by the straight lines around the holes H. The means which I have illustrated for connecting the integral axles of the crank together may be greatly varied. Consequently I do not wish to be confined to the specific means shown.

Having described my invention, what I claim as new, and desire to secure by Letters Patent, is—

1. The combination in a bicycle crank and axle, of independent cranks having integral half-axle portions adapted to meet in the crank-hanger, a key extension on each half-axle, a slot or keyway on the surface of each half-axle adapted to receive said key extension, a thread on the end of said key extension, tapering nuts on said threaded ends, taper-perforations through said cranks continuous from said keyways adapted to receive the ends of said key extensions and said taper-nuts, and an oblique joint between the abutting ends of said half-axles adapted to draw the said key extensions, and opposing halves of said axles together.

2. The combination in a bicycle crank-axle of two oppositely-disposed crank-arms, each having an integral axle adapted to meet one another in abutment in the central portion of the crank-hanger, an oblique joint between said abutting ends, and each of said axles having extending from its end a rectangular key portion adapted to fit a rectangular keyway in the opposite axle and to extend through suitable holes in the opposite crank-arm, means for securing the ends of said key portions to the cranks to secure the said crank-axles together, and means for securing the sprocket driving-wheel and roller-bearings to said crank-axles.

3. In a crank-axle for bicycles, the combination of the two crank-arms forged to two independent abutting and overlapping half-axles, said half-axles being formed to separate the completed axle in an oblique plane, cutting its longitudinal axis, an oblique joint at the abutting ends of said half-axles, a taper-key extending from opposite sides of each abutting end and adapted to overlap and lie on one another, and to extend to the outside of said crank-arms, a thread and taper-nut on the ends of said key portions, a keyway in each half-axle continuous in line with its key and of its taper, and taper-holes from said keyways through said crank-arms adapted to receive said threaded ends and nuts of said keys, whereby the said half-axles are united in a continuous rigid axle with integral crank-arms.

4. The combination in a bicycle-axle, of two similar half-axles formed by dividing the axle obliquely of its longitudinal axis, an oblique abutting transverse joint between the half-axles, a taper-key integral with each half-axle having a threaded end and a taper-nut thereon, and adapted to lie on each other, a keyway in each half-axle adapted to receive the key of the opposite half, and means whereby said half-axles may be drawn together into a complete continuous rigid axle from the outside of said crank-arms, substantially as described.

In testimony whereof I affix my signature in presence of two witnesses.

FRANK J. GRODAVENT.

Witnesses:
WARNER H. DOUTHAT,
CHAS. M. ANGUS.